United States Patent
Wu et al.

(10) Patent No.: US 8,261,220 B2
(45) Date of Patent: Sep. 4, 2012

(54) PATH PRESERVING DESIGN PARTITIONING WITH REDUNDANCY

(75) Inventors: Qiuyang Wu, Portland, OR (US); Brian Clerkin, County Dublin (IE)

(73) Assignee: Synopsys, Inc., Mountain View, CA (US)

( * ) Notice: Subject to any disclaimer, the term of this patent is extended or adjusted under 35 U.S.C. 154(b) by 251 days.

(21) Appl. No.: 12/628,096

(22) Filed: Nov. 30, 2009

(65) Prior Publication Data

US 2011/0131540 A1    Jun. 2, 2011

(51) Int. Cl.
G06F 17/50  (2006.01)
G06F 9/455  (2006.01)

(52) U.S. Cl. ........ 716/113; 716/105; 716/108; 716/132; 716/134; 716/123; 716/124; 716/125

(58) Field of Classification Search .................. None
See application file for complete search history.

(56) References Cited

U.S. PATENT DOCUMENTS

| | | | | |
|---|---|---|---|---|
| 5,831,869 | A * | 11/1998 | Ellis et al. | 716/103 |
| 6,845,494 | B2 * | 1/2005 | Burks et al. | 716/108 |
| 6,851,099 | B1 * | 2/2005 | Sarrafzadeh et al. | 716/123 |
| 6,996,515 | B1 | 2/2006 | Foltin et al. | |
| 7,216,317 | B2 * | 5/2007 | Sripada | 716/113 |
| 7,308,666 | B1 * | 12/2007 | Li | 716/113 |
| 2001/0010090 | A1 * | 7/2001 | Boyle et al. | 716/2 |
| 2005/0172250 | A1 | 8/2005 | Kucukcakar et al. | |
| 2007/0033561 | A1 | 2/2007 | Jones et al. | |

* cited by examiner

Primary Examiner — Leigh Garbowski
Assistant Examiner — A. M. Thompson
(74) Attorney, Agent, or Firm — Bever, Hoffman & Harms, LLP; Jeanette S. Harms

(57) ABSTRACT

Partitioning of a design allows static timing analysis (STA), signal integrity, and noise analysis to be performed in parallel on multiple, less demanding, and more available hardware resources. Therefore, runtime and throughput of the analysis can be significantly shortened. Notably, the partitioning can include redundancy. That is, partitions are allowed to share objects in order to preserve the timing path completeness and design structural integrity. Due to this redundancy, these partitions can account for many constraints specifically imposed by STA and ensure minimal inter-partition data dependency during the analysis. Once these partitions are populated, analysis can be performed on those partitions in parallel to generate the same timing results as if the design had been analyzed flat as a single unit. Therefore, the performance of the analysis can be optimized without compromising the accuracy and quality of results.

34 Claims, 11 Drawing Sheets

PATH PRESERVING DESIGN PARTITIONING WITH REDUNDANCY

BACKGROUND OF THE INVENTION

1. Field of the Invention

The present invention relates to static timing analysis, and in particular to partitioning of an integrated circuit design to ensure fast, parallel, and accurate analysis. Notably, this partitioning allows redundancy, i.e. the sharing of objects between partitions, thereby ensuring complete timing paths for objects of the design and improving subsequent analysis.

2. Related Art

Static timing analysis (STA) is a method of estimating the expected timing of a circuit without performing simulation (which tends to be slow and complex). In STA, timing analysis can be carried out in an input-independent manner (hence the term "static") to determine the worst-case delay of the circuits in the design over all possible input combinations. To provide fast, reasonably accurate estimates of circuit timing, STA relies on simplified delay models and minimizes consideration of the effects of signal interactions.

Notably, the size, and functional and physical complexity of integrated circuit designs continue to grow rapidly due to advancements in system integration, design techniques, and manufacturing technologies. As a result, it takes ever longer runtime, and demands ever more powerful computing hardware with ever larger capacity to perform full chip STA. Therefore, STA tools can increasingly become a major bottleneck in integrated circuit design flow.

Therefore, a need arises for techniques to increase the speed and reduce the monolithic machine memory requirement of STA while still ensuring accurate timing estimations.

SUMMARY OF THE INVENTION

A method of partitioning an integrated circuit design for static timing analysis is described. This method is based on hierarchy driven topological clustering. In this method, at least one file listing objects of the design can be accessed. Exemplary files can include VHDL files and/or Verilog files. Using the at least one file, a set of objects that describe the circuit design and its hierarchical structure can be obtained. Endpoints of the design can be clustered based on their hierarchical relation. Endpoints of an endpoint cluster can be preset using a partition assignment representation. One such representation uses bitwise encoding (bit-code). After presetting, this partition assignment representation can be propagated from the endpoints back through the design to determine the circuit objects in the fan-in of those endpoints. This propagation populates a partition. The steps of presetting and propagating can be repeated for each endpoint cluster. Populated partitions can become reduced circuits and output for use as inputs for static timing analysis. Notably, at least one set of populated partitions includes redundant objects, which implies duplicated objects among partitions.

In one embodiment, the populated partitions can be optimized before output. For example, a set of partitions can be merged based on a cost metric associated with each populated partition. In another embodiment, clustering of the endpoints includes over-clustering, i.e. creating more endpoint clusters than would otherwise be needed and/or specified. This over-clustering allows greater flexibility during merging.

Another embodiment of partitioning an integrated circuit design for static timing analysis is also described. This method is based on fine grain topological clustering. In this method, after building the circuit design using the files (e.g. VHDL or Verilog), a global cost can be very quickly estimated and a target cost for each partition can be determined. Seed endpoints of a fine grain cluster can be preset using a partition assignment representation. In one embodiment, the partition assignment representation can be a bit code. At this point, signals from the seed endpoints can be propagated back through the design to determine the circuit objects that are in the fan-in of the seed endpoints. This propagation populates a partition. Propagation is stopped at design objects without backward fan-in objects, and when a cost associated with that populated partition reaches or exceeds the target cost. In one embodiment, during propagation, clustering preferences can be gathered. These clustering preferences can advantageously facilitate adding at least one seed endpoint to the fine grain cluster based on a constraint associated with an object in the populated partition. The steps of presetting and propagating can be repeated for each fine grain cluster. Populated partitions can become reduced circuit inputs for static timing analysis. Notably, at least one set of populated partitions includes redundant objects, which implies duplicated objects among partitions.

A computer-readable medium storing therein computer-executable instructions for partitioning an integrated circuit design for static timing analysis is also described. These instructions, when executed by a computer, perform the above-described steps associated with hierarchy driven topological clustering or fine grain topological clustering, or a combination of the methods described.

DETAILED DESCRIPTION OF THE FIGURES

In accordance with one aspect of the present invention, static timing analysis (STA) can include partitioning with redundancy. Partitioning allows the targeted timing analysis to be performed in parallel on multiple, less demanding, and more available hardware resources. Optionally, partitioning also allows the targeted analysis to be performed in parallel on a single hardware with enough resource. Therefore, runtime of STA can be significantly shortened. In another embodiment, when machine memory resource is the most constraining factor, because partitioning results in sub-circuits with reduced sizes, the targeted analysis can be performed on one partition or a subset of these partitions in some sequential order to reduce the peak memory requirement of the analysis. Without losing generality, the use of partitioning technique in parallel analysis provides for runtime speedup.

Note that design partitioning is an overhead function because it introduces an additional step in the STA flow. Hence, design partitioning usually does not exist in traditional analysis flows. Therefore, the performance of the design partitioning is key to the effectiveness of the parallel solution overall.

Notably, the partitioning described herein also includes redundancy. That is, partitions are allowed to share objects such that some objects are allowed to be repeated or shared among many and/or all partitions, if necessary, in order to preserve the timing path completeness and design structural integrity. Objects can include, for example, logic gates, wire connections, storage devices (e.g. flip-flops or latches), etc. Due to this redundancy, these partitions can account for many constraints specifically imposed by STA. Once these partitions are populated, analysis can be performed on those partitions in parallel to generate the same timing results as if the design had been analyzed flat as a single unit. Therefore, the performance of STA can be optimized without compromising the accuracy and quality of results (QoR).

Note that this partition redundancy is functionally distinct from data dependency, which is advantageously eliminated using the partitioning technique described herein. Data dependencies, unlike redundancy, require expensive inter-process communication to resolve in order for the analysis to be performed correctly. Therefore, allowing data dependencies to remain would otherwise largely defeat the purpose of partitioning.

In accordance with one aspect of improved partitioning, static cost metrics can be applied to each design. These static cost metrics can be derived from actual performance and capacity measurements of STA tools. For example, FIG. 1 illustrates various metric correlations derived from exemplary, industry designs.

Figure 1:
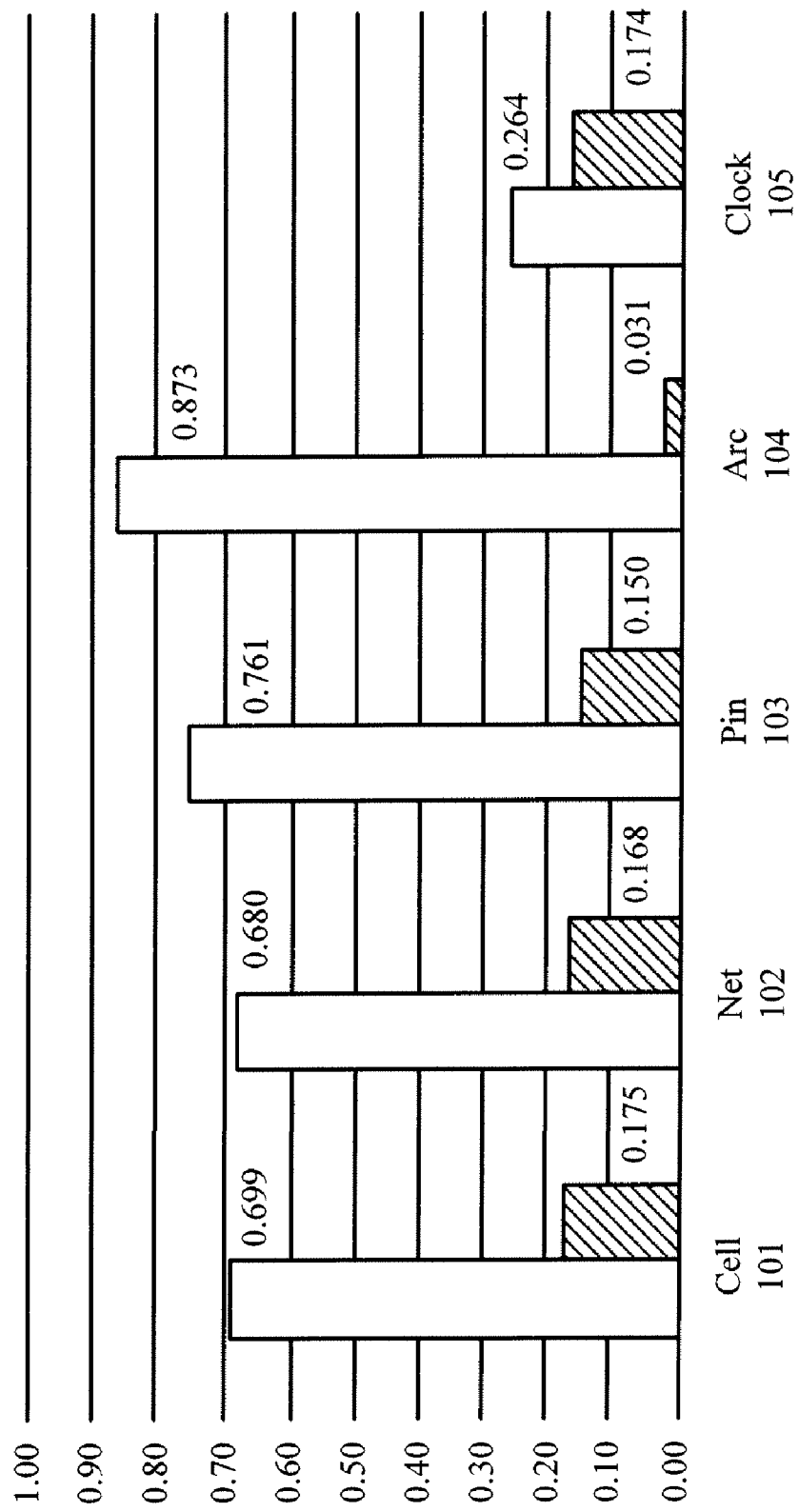
FIG. 1 illustrates exemplary statistical correlations between design static metrics and tool runtime metrics.

FIG. 1 was generated by accessing a design, determining the number of cells (e.g. logic gates or storage devices), nets (i.e. wire lines between cells), pins, arcs (wherein an arc is between an input pin of the cell and an output pin of that cell), and clocks of that design, measuring the runtime of performing targeted analysis of the design, and measuring the memory needed for that runtime. A correlation between the measured runtime and the measured memory against the metrics, i.e. cells, nets, pins, arcs, and clocks, was then determined. This process was repeated for hundreds of industry designs covering a wide range of design styles and technologies.

The normalized results of these correlations are shown in FIG. 1. Cell metric 101 indicates a 0.699 correlation geometric mean; net metric 102 indicates a 0.680 correlation geometric mean; pin metric 103 indicates a 0.761 correlation geometric mean; arc metric 104 indicates a 0.873 correlation geometric mean; and clock metric 105 indicates a 0.264 correlation geometric mean. Each correlation geometric mean indicates the prediction accuracy of using that metric to determine runtime and memory. For example, by knowing the number of arcs in any design, the runtime and memory requirements for that design can be estimated with 87.3% accuracy. Note that each metric has a corresponding sigma, i.e. the mean error, which is shown as a bar with a fill pattern. For example, arc metric 104, which exhibits the highest correlation geometric mean, has a mean error of 0.031 (i.e. 3.1%).

Advantageously, a set of these static design metrics can be used in a cost function to improve partitioning, as explained in further detail below. Note that a cost function can be based on one metric, a combination of metrics, or all metrics shown in FIG. 1.

Partitioning with redundancy can be performed using hierarchy driven topological clustering and/or fine grain topological clustering. In general, the hierarchy driven topological clustering is particularly effective when hierarchy levels are apparent and well formed, whereas fine grain topological clustering is particularly effective when hierarchy levels are not as apparent or well formed. Depending on the structure and style, some designs (or portions of the design) may benefit from hierarchy driven topological clustering and other designs (or portions of the design) may benefit from fine grain topological clustering. Moreover, although described as separate techniques in FIGS. 2 and 3, these techniques can readily be used in combination in some embodiments.

Figure 2:
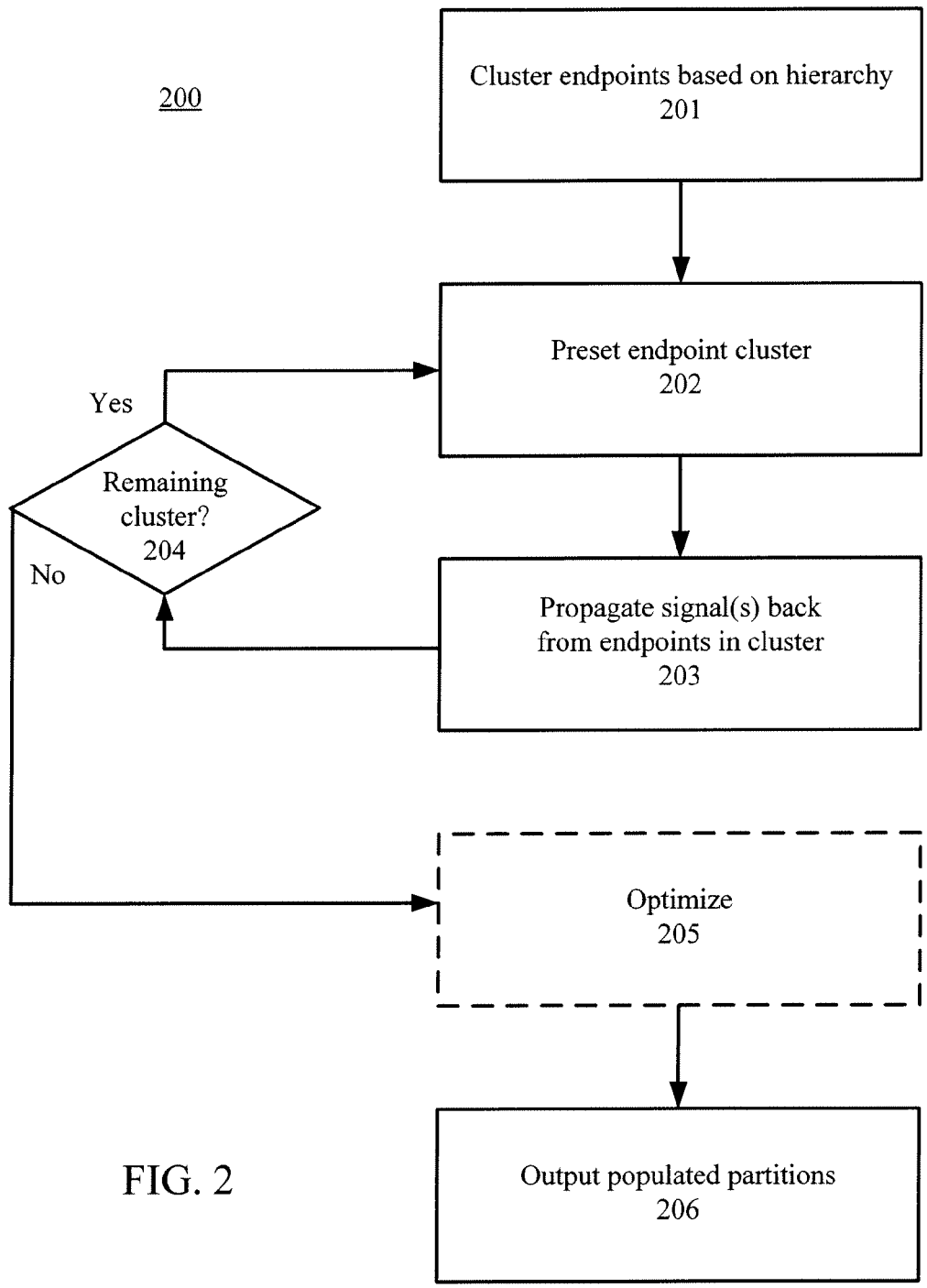
FIG. 2 illustrates an exemplary partitioning technique using hierarchy driven topological clustering.

FIG. 2 illustrates an exemplary circuit hierarchy driven topological clustering technique 200. As described above, technique 200 can be particularly effective when the design includes a number of hierarchical objects, e.g. memory arrays or other large-scale cells that are regularly structured. Specifically, hierarchical objects can advantageously indicate a strong, inherent design intention for natural grouping that can be leveraged by technique 200.

Step 201 can cluster the endpoints of a design based on their hierarchy. As used herein, the term "endpoint" can refer to a data (D) pin of a storage device or refer to any primary output port of the design. In one embodiment, this clustering can be performed using one or more files listing objects of the design. Exemplary files can include Verilog files and/or VHDL (very high speed integrated circuit hardware description language) files for the design, which are inherently hierarchical in their hardware descriptions. In another embodiment, this clustering can be performed based on naming conventions. For example, sets of objects may be named "mem_ . . . " or "cpu_ . . . ", which can indicate a preference to be grouped together to form a hierarchical element, e.g. a memory or a central processing unit (CPU). In other words, the naming convention of a design file may also indicate a design's inherent partitioning. Thus, the physical and/or logical hierarchy of the design can be leveraged in step 201.

In step 201, an initial target number of hierarchical endpoint clusters is selected. In one embodiment, the target number can be selected to be a number (e.g. 8, 16, 32, 48 etc.) that easily corresponds to a set of bit codes (described in further detail below). The endpoint clusters are then derived by examining the hierarchy of the design. During this initial clustering phase, clusters are defined such that:

all clusters have approximately the same number of endpoints,
all endpoints in the same cluster are from the same hierarchy, and
the final number of clusters approximates to the target number of clusters.

If it is found that a top level hierarchy has too many endpoints to derive a cluster of the appropriate size, then multiple endpoint clusters can be derived for this hierarchy. In this case, sub-hierarchies can be examined recursively until clusters are derived of the appropriate size. Some endpoints do not belong to a hierarchy (e.g. output ports). A backward trace is performed from each of these output port endpoints. If a hierarchy is found during the backwards trace for a given output port endpoint, then the output port endpoint is placed into the endpoint cluster corresponding to that hierarchy. If no hierarchy is found, then the output port endpoint is placed in a default cluster.

In step 202, the endpoint clusters are ranked in terms of number of endpoints. Each of the N largest clusters are assigned a unique bit code (where N=target number from step 201). All endpoints of a given cluster are preset with the unique bit code of that cluster.

At this point, step 203 can propagate the bit code along signal paths backward from all of the endpoints preset in step 202 (note that propagation is described in further detail in reference to FIGS. 4B-4F). Note that as the bit code propagates, the objects through which the bit code propagates are added to a partition, and each such object can be tagged with the bit code to identify it as part of that partition. Thus, this propagation effectively determines the transitive fan-in to that endpoint cluster. In one embodiment, step 203 can also evaluate the cost of each partition as they are formed to determine the size of the partition, as well as its overlap and redundancy with other partitions.

Step 204 can determine whether any remaining endpoint cluster remains. If so, then the process can return to step 202 to preset another endpoint cluster by assigned a unique bit code to its associated endpoint(s). In one embodiment, step 204 can examine the results from previous propagations to assign an endpoint cluster to a previously used bit code. Steps 202-204 can be repeated until all endpoint clusters are assigned with a bit code and propagated to their entire transitive fan-in circuit.

At this point, optional step 205 can optimize these initial partition assignments resulting from the propagations performed in step 203. The aim of this optimization is to minimize the maximum cost of the partitions by minimizing overlap and achieving good balance. For example, certain partitions may be merged to form a new, larger partition. For example, assuming that four initial partitions A, B, C, D have been formed by steps 202-204, and the target partition is two, step 205 may determine that objects in partition A drive objects in partition B, and objects in partition C drive objects in partition D. Thus, partition A is highly correlated to partition B, and partition C is highly correlated to partition D. Therefore, step 205 can merge partitions A and B into a new partition A' as well as merge partitions C and D into a new partition B'.

This merging can advantageously reduce overlap between partitions, thereby optimizing the global design partitioning. In one embodiment, topological distances between partitions can also be considered as part of the optimization, i.e. depending on the cost of each partition, partitions that are closer together (and which therefore have a higher probability of being correlated) may be considered for merging before partitions that are further apart.

This merging can also take into account balancing. For example, after correlated partitions are merged, certain uncorrelated partitions may be notably smaller than the merged partitions. Therefore, to provide similar runtime/memory requirements for all partitions, step 205 may merge certain uncorrelated partitions, if necessary. Step 206 can output these optimized partitions as reduced circuit inputs for use in the STA tool. In one embodiment, this partitioning output may also become visible and provided to the user.

In one embodiment, step 201 can "over-cluster", i.e. create more endpoint clusters than would otherwise be specified or called for, thereby allowing step 205 more flexibility in determining inter-partition correlations to perform the partition optimization. For example, while step 201 may initially call for 32 endpoint clusters, which would typically result in at least 32 partitions (based on signal propagation), step 205 may merge various partitions to yield only 4, 8, or 12 partitions.

Figure 3:
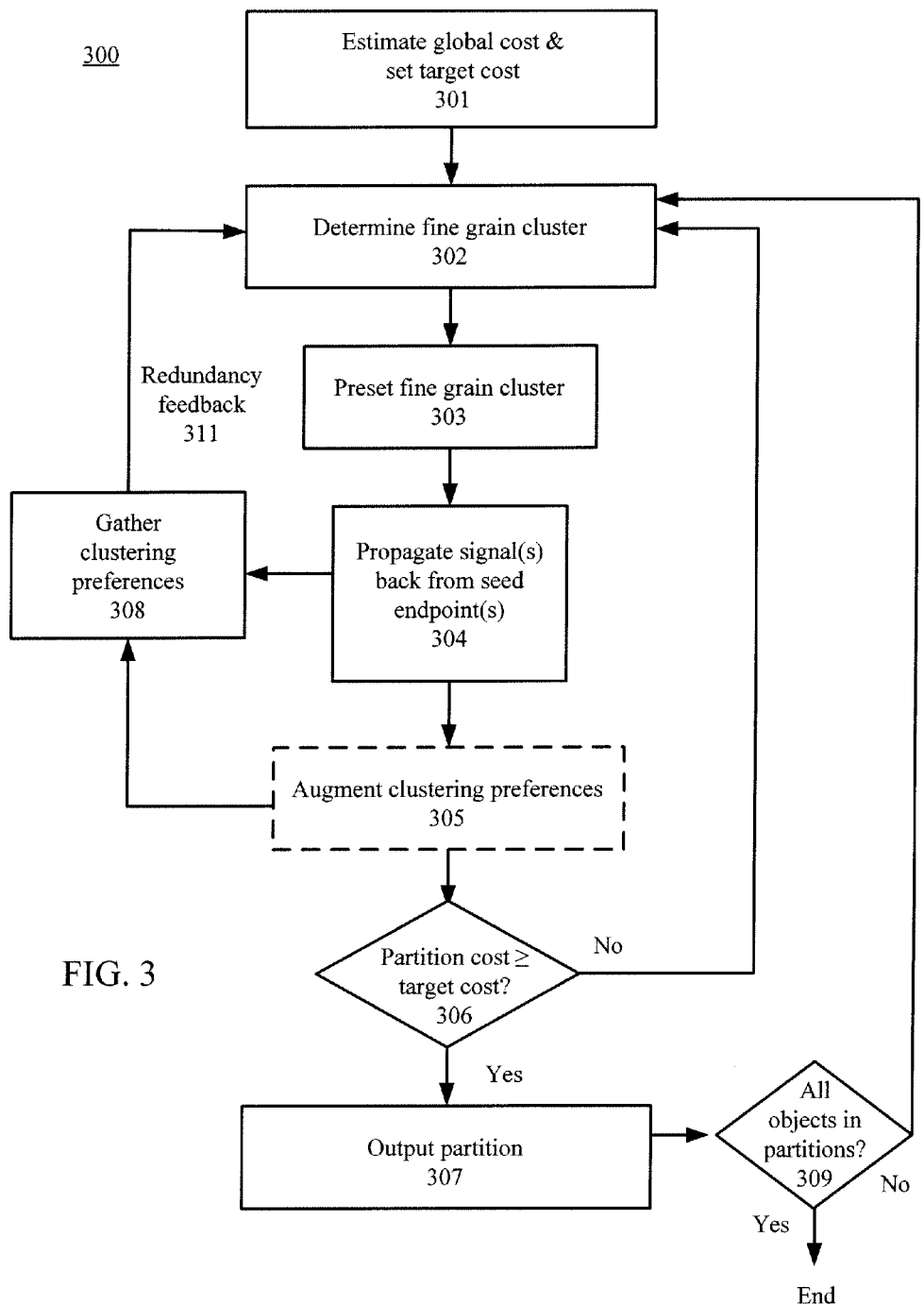
FIG. 3 illustrates an exemplary partitioning technique using fine grain topological clustering.

FIG. 3 illustrates an exemplary fine grain topological clustering technique 300, which focuses on balancing of the partitions while inherently minimizing redundancy. In step 301, a global cost can be estimated quickly and a target cost can be set. Referring back to FIG. 1, a global cost function can be estimated by first counting the number of those selected types of objects in a design. For example, focusing solely on arcs for the sake of simplicity and not losing generality, assuming that a unit cost of 1 is assigned to each arc and the design has a total of 100 arcs, then the global cost is 100. Further assuming that the target number of partitions is 4, the target cost is therefore computed to be 25, which means an average of 25 arcs per partition and gives the ideal target cost per partition. During the propagation step of technique 300 (discussed below), objects of the design are visited and added to a first partition until the target cost is reached or exceeded, at which point a second partition is created. This process continues until all partitions are created and populated, and all endpoints are assigned to partitions.

Step 302 determines a fine grain cluster. Note that the term "fine grain" is relative to the total number of endpoints in a design. For example, where 6 endpoints are provided in a design (i.e. an extremely simple design), each fine grain cluster may have a single endpoint. In contrast, where 50,000 endpoints are available in a design, a fine grain cluster may have 500 endpoints. The key point of "fine grain" means the size of each endpoint set is significantly smaller than an average number of endpoints that would eventually have been assigned to each partition.

In step 303, one endpoint cluster is preset with a predetermined bit code as a tag. Step 304 propagates a signal back from each seed endpoint of the fine grain cluster. As used herein, the term "seed" endpoint can refer to any selected primary output port of the design as well as any selected data (D) pin of a storage device. More specifically, step 304 propagates a signal upstream from a seed endpoint to determine its fan-in cone. In one embodiment, when each object with pre-assigned cost is encountered during this propagation, it triggers a costing function to be evaluated and a counter to be increased by the resulting units of cost, therefore keeping track of the partition cost while growing the partition by that object.

Note that during this propagation, certain clustering preferences may be found and passed onto step 308 that gathers these clustering preferences. Clustering preferences can advantageously identify related objects (e.g. topological correlations), physical proximity of fan-in cones, or overlapping fan-in cones that would make inclusion of those objects in the same partition desirable. Step 305, which in one embodiment is optional, can augment the clustering preferences (gathered in step 308) using wire cross-coupling identification and/or other signal integrity (SI) measures.

Step 306 can determine whether the current propagation to an endpoint in a partition results in a partition cost equal to or greater than the target cost. For example, if a global cost for the design is 50 and the number of partitions is 2, then the target cost is 25. If the cost associated with the current partition is not equal to or greater than the target cost, then additional objects can be added to the partition (wherein each object has an associated cost). Therefore, the process can return to step 302 to determine another endpoint for signal propagation. Note that step 302 can determine the next seed endpoint based on redundancy feedback 311, which is gathered by step 308. Steps 303 and 304 can then be performed based on that new seed endpoint.

If the partition cost becomes equal to or greater than the target cost, then additional objects are preferably not added to the present partition. Therefore, step 307 can output the partition, which can be used during STA. If not all objects in the design are assigned in the populated partitions, as determined in step 309, then additional partitions can then be created and populated using steps 302-309. Alternatively, the pre-populated partitions can be sorted by their total costs and the partition with the lowest actual cost can be augmented to include additional "fine-grain" set of endpoints. This process is repeated dynamically until all objects in the design are in the populated partitions, at which point partitioning ends.

Note that both the global cost and the target cost can be computed or estimated from the number of selected types of objects in the design, some of these types are illustrated in FIG. 1. In one embodiment, these costs can be estimated by a quick tally of the types of objects, with each object assigned a unit cost. In another embodiment, certain objects can be weighted more heavily than other objects. For example, arcs on a clock network tend to be more costly during analysis. Therefore, in one embodiment, these clock arcs can be weighted more than other arcs exist in the data paths. In another embodiment, the costs can be even more accurately estimated by the use of a combination of the types of objects, each with a weight coefficient either empirically measured or analytically assigned based on key algorithmic complexity analysis.

Figure 4A:
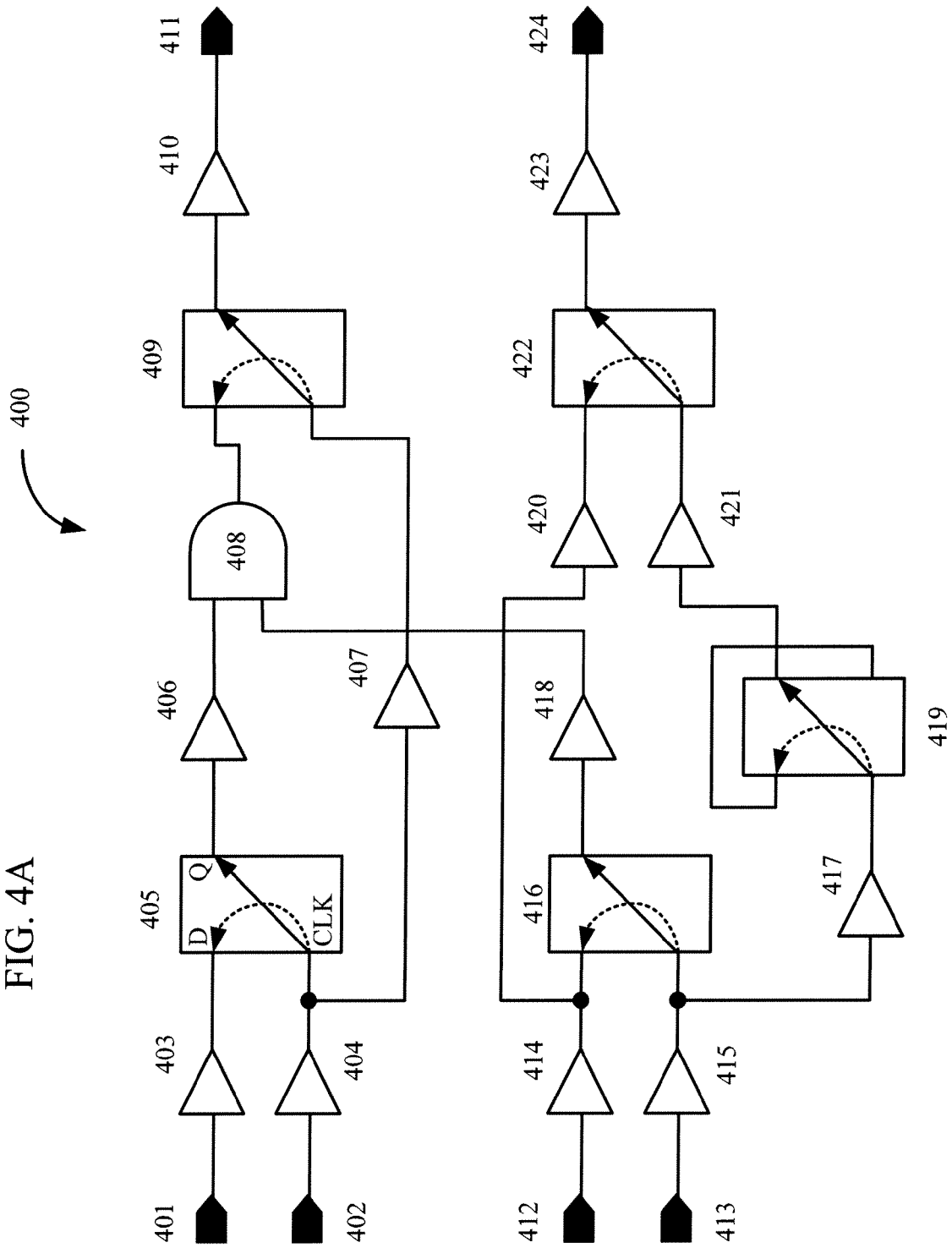
FIGS. 4A-4F illustrate the partitioning of a simple circuit using the technique of FIG. 3.
Figure 4B:
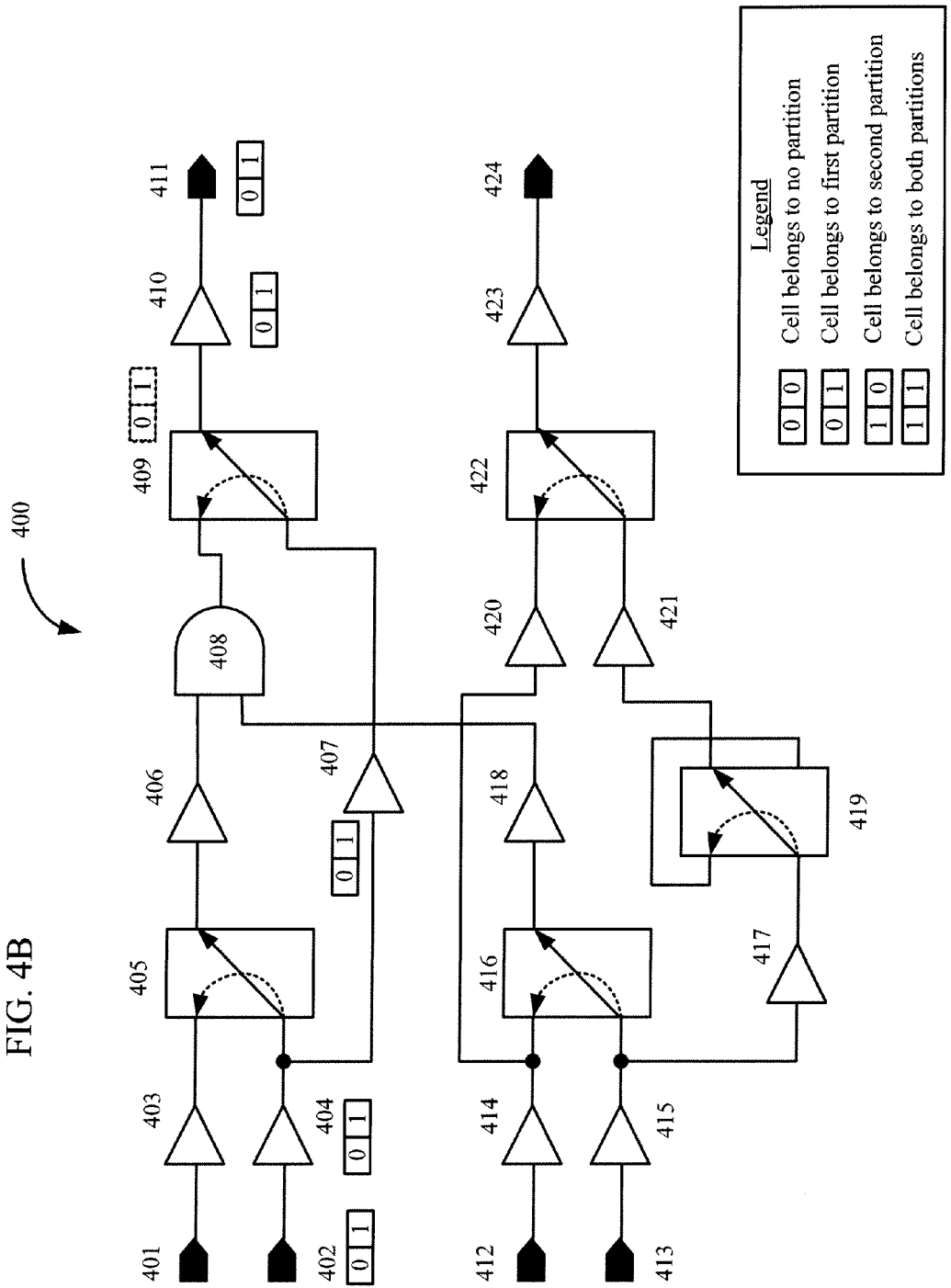

FIG. 4A illustrates an exemplary circuit 400 that is to be partitioned using fine grain clustering. In this embodiment, circuit 400 includes input ports 401 and 402, buffers 403, 404, 406, 407, 410, 414, 415, 417, 418, 420, 421, and 423, flip-flops 405, 409, 416, 419, and 422, an AND gate 408, and output ports 411 and 424. Note that each of flip-flops 405, 409, 416, and 422 is shown having two internal arrows: a solid arrow that connects the clock (CLK) pin to the Q pin and a dotted arrow that connects the CLK pin to the D pin. The solid arrow indicates a timing path for purposes of signal propagation. The dotted arrow indicates a constraint, i.e. although initially the D and the Q pins of a storage device can be tagged independently, a storage device must be ultimately assigned as being in one partition or being shared by two partitions. As described in further detail below, tagging of the Q pin, which occurs during propagation, also automatically tags the CLK pin (and vice versa).

Note that the target number of partitions can be based on factors such as direct user specification, or computing resource availability, or the topological relationship between timing endpoints (discussed below). In a complex design having millions of objects and a large number of possible partitions, a target number of partitions is generated based on applying one or more rules including parameters specified by the user indicating a fixed number of partitions through certain user-interface (UI) provided by the software program implementing the partitioning, and/or some existing hardware, software (e.g. licensing) constraints, and/or the optimal and desirable number of partitions, etc. For FIG. 4B, assume that two partitions are targeted.

In accordance with one aspect of improved partitioning, each object of circuit 400 can be tagged with a bit code. Because only two partitions are targeted for circuit 400, the binary code can include two bits that identify whether the object is assigned to a first partition, a second partition, a shared partition, or no partition. Exemplary bit codes are shown in the legend for FIG. 4B.

To begin partitioning, the timing endpoints of a design can first be identified. In circuit 400, the timing endpoints are output ports 411 and 424 as well as the D pins of flip-flops 405, 409, 416, 419, and 422. The designation of any object into the two partitions can be based on using the timing endpoints as seeds, as described above.

In one embodiment, the endpoint associated with output port 411 can be used as an initial seed to create the first partition and is tagged accordingly (i.e. 0,1). Propagating a signal upstream would result in tagging buffer 410, the Q pin of flip-flop 409, buffer 407 and 404 as well as input port 402 as being part of the first partition.

Note that for purposes of partitioning, the timing of a storage device is of primary interest, not its data propagation path. That is, a clock signal triggers the flip-flop to transfer the value on its D pin to its Q pin (as indicated by the solid arrow). Therefore, when propagating backwards, the signal traverses from the Q pin to the CLK pin (not the D pin). Note that because only the Q pin of flip-flop 409 is tagged (and its corresponding CLK pin), this tag can be deemed conditional on the tagging of its D pin (indicated by the dotted box in FIG. 4B).

To clarify for the purpose of generality, even though it is not illustrated in the figures, there is another common class of storage device that are usually termed as level-sensitive transparent latches, as oppose to flip-flops that are triggered on clock edges. For these transparent latch devices, there are arcs between their D pins and Q pins, hence direct signal paths from D to Q exist so that the backward propagation shall traverse across to include the objects in the fan-in of D pin in the same partition as Q pin. Actually, for such transparent latch devices, their D pins can be either considered as not partition endpoints at all, or forced to be partition end points. In one embodiment, they are to be included and populated into a partition while propagating backward through Q to D from some real partition endpoints on the flip-flop data pins and/or output ports. In this embodiment, for the purpose of partitioning, the processing of transparent latch device is hence the same as any other combinational non-storage cells. In another embodiment, these transparent latch D pins can be designated as endpoints such that the propagation through Q backward to D is blocked and the objects in the fan-in of the latch's D pin will be determined by partition assignment of the D pins, not by the Q pin partition assignment propagated backward from other endpoints. Therefore, one can assume storage devices to be flip-flops for the sake of simplicity in this description, because treating transparent latches as either combinational cells or flip-flops does not lose any generality in this description.

Note that the dotted arrows in the flip-flops indicate constraints. That is, although the timing propagation path is of primary concern for an initial partitioning, the optimization of the resulting partitions can advantageously ensure that storage devices, once conditionally tagged, will be ultimately tagged as either part of the partition conditionally tagged or shared between partitions. This constraint on the tagging of the storage devices ensures that storage devices are properly tagged during propagation and partition population such that all timing path segments leading to the storage device are preserved in a given partition.

Figure 4C:
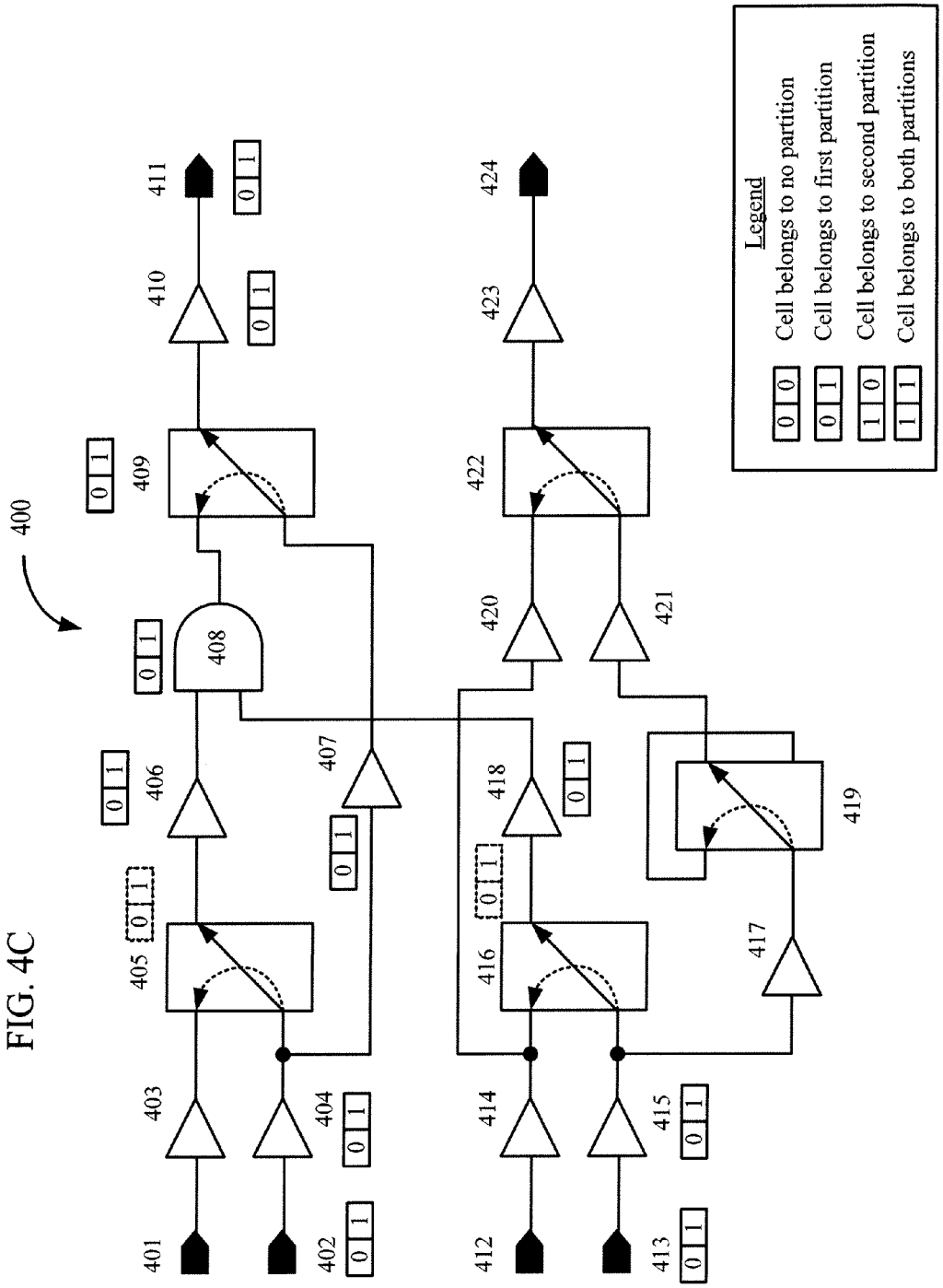

Referring now to FIG. 4C, the node at the output of buffer 404 is also connected to the CLK pin of flip-flop 405. Therefore, the signal can also be propagated forward to the Q pin of flip-flop 405, buffer 406, AND gate 408, and the D pin of flip-flop 409. Note that because both the D pin of flip-flop 409 and the Q pin of flip-flop 409 are tagged as the first partition, flip-flop 409 can be designated as unconditionally part of the first partition. In contrast, only the Q pin of flip-flop 405 has been tagged. Therefore, flip-flop 405 is conditionally tagged as being part of the first partition.

As shown in FIG. 4C, because AND gate 408 is tagged as being in the first partition, any fan-in into AND gate 408 should also become part of the first partition. Therefore, buffer 418, the Q pin of flip-flop 416, buffer 415 and input port 415 are also tagged as being part of the first partition. That is, propagating continues until it reaches an object without further backward fan-in objects. Notably, as discussed above, during propagation, the number of accumulated objects in the first partition can be counted. Assuming that the number of total arcs in design 400 is 18 (and that only arcs are considered for simplicity without losing generality) and the target number of partitions is 2, then a count of 9 arcs can be used to initiate creation of the second partition. Because the present number of arcs is already at 10, the first partition is deemed to be "full".

Figure 4D:
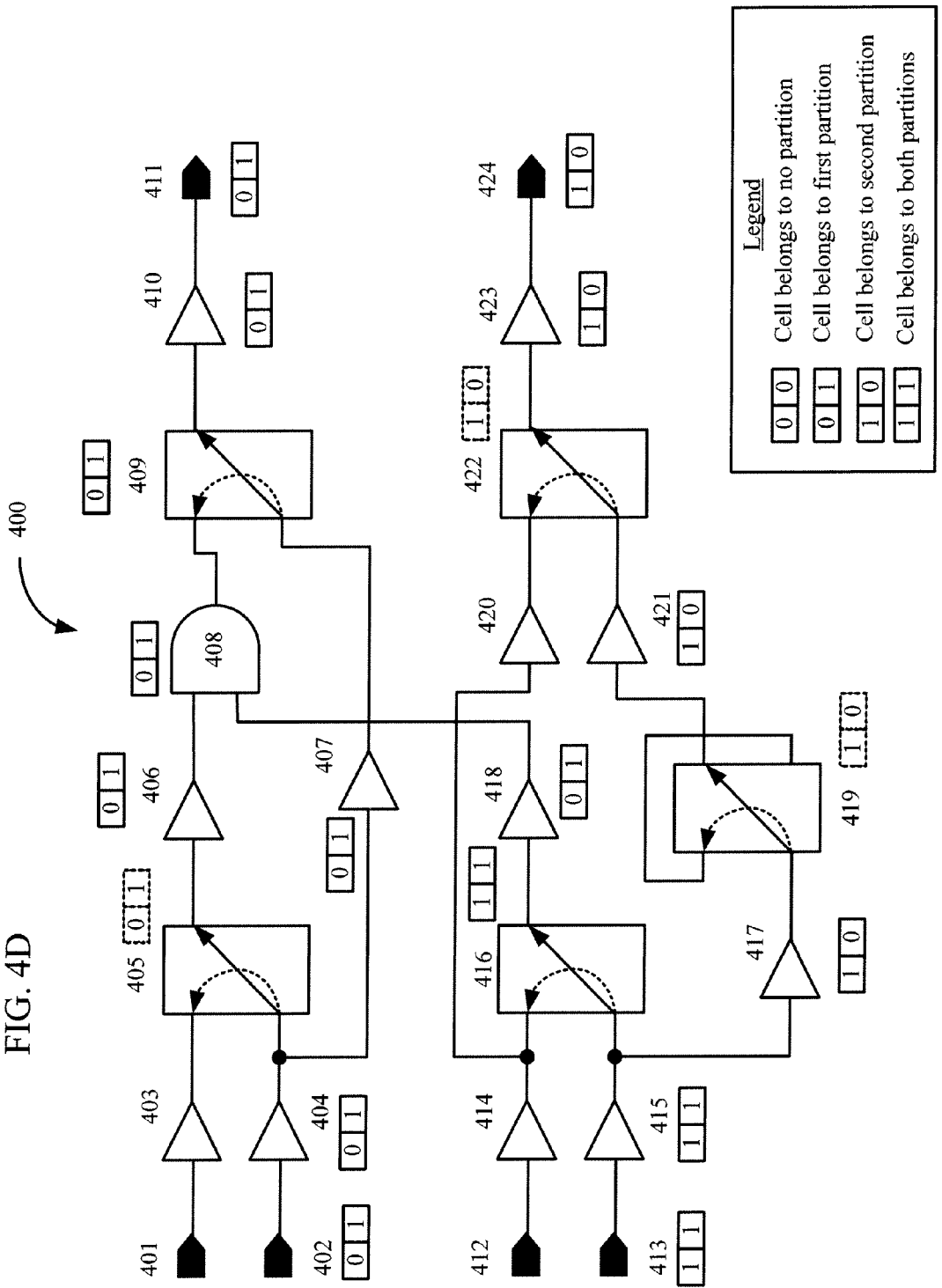

FIG. 4D illustrates the creation of the second partition starting with propagation from the endpoint associated with output port 424. As shown, buffer 423, the Q pin of flip-flop 422 (conditional), buffer 421, the Q pin of flip-flop 419 (conditional), buffer 417 and 415, input port 413, the Q pin of flip-flop 416 (conditional), and buffer 417 can be tagged as part of the second partition. Note that buffer 415 and input port 413 are already assigned to the first partition, but in light of buffer 417 should also be assigned to the second partition. Therefore, buffer 415 and input port 413 can be assigned to share the first and second partitions. As a result, the Q pin of flip-flop 416 should also be reassigned to share the first and second partitions.

Figure 4E:
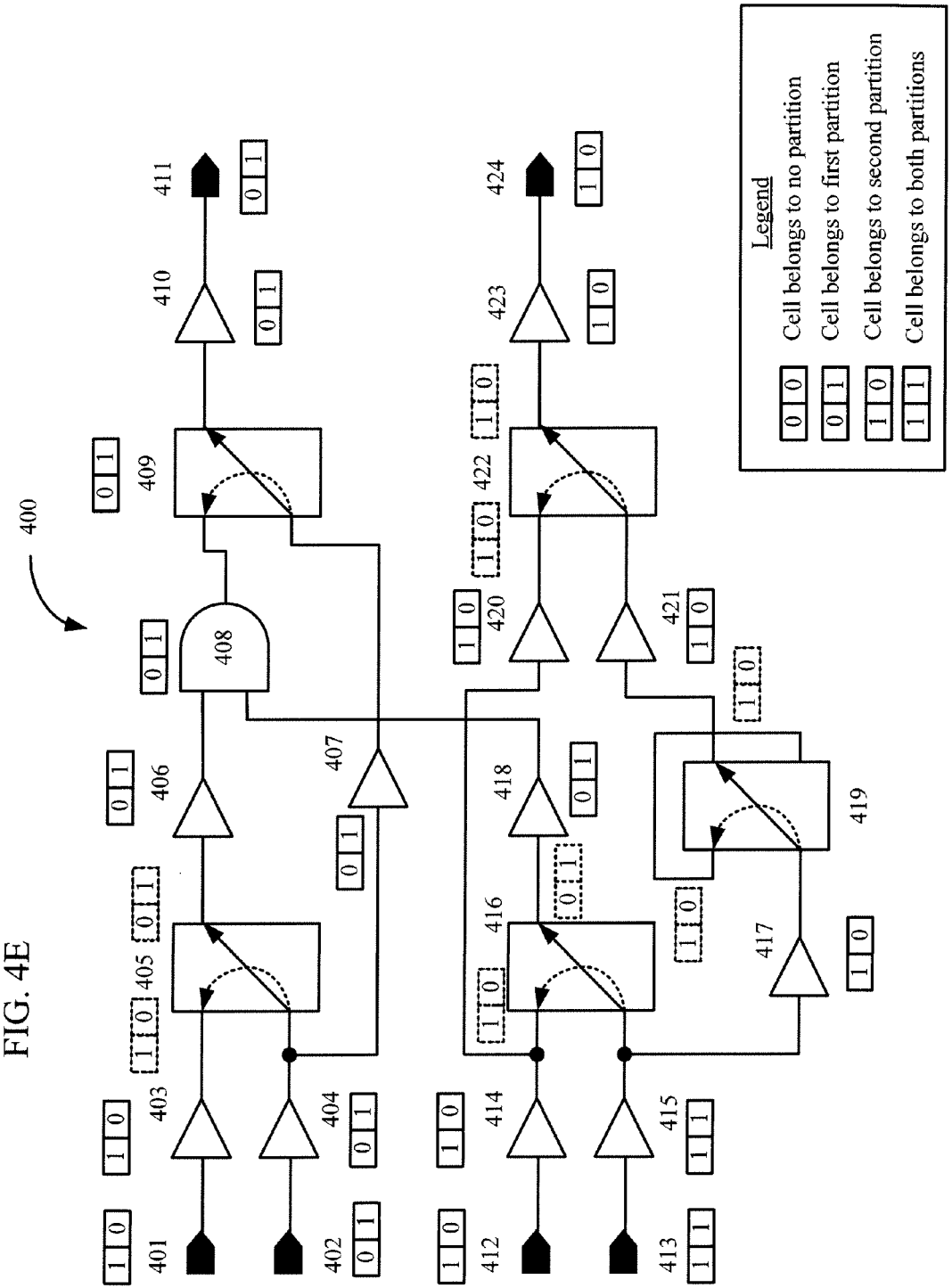

Because only two partitions are targeted for design 400, all remaining, currently unassigned cells can be assigned to a currently smaller partition, which is the second partition, as shown in FIG. 4E. Specifically, input port 401, buffer 403, the D pin of flip-flop 405, input port 412, buffer 414, the D pin of flip-flop 416, buffer 420, the D pin of flip-flop 422, and the D pin of flip-flop 419 can all be assigned to the second partition. Note that if multiple partitions are left to be populated, then the above-described propagation can be performed from each endpoint (e.g. to determine assignment to second, third, etc. partitions) until the predetermined cost function is met.

Figure 4F:
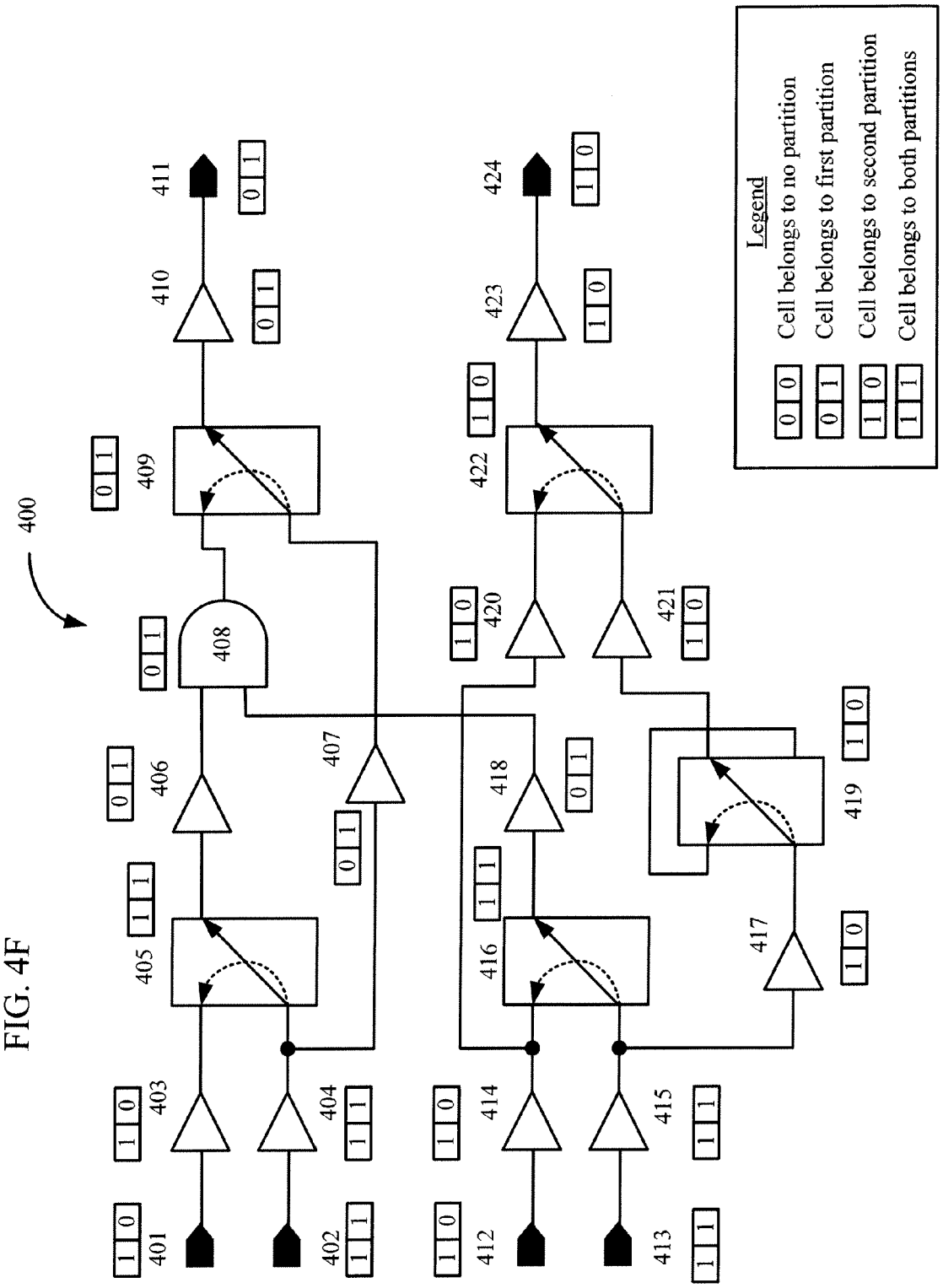

Any storage devices having the same partition assignment on their D and Q pins can be tagged as being unconditionally assigned to that partition. For example, flip-flops 419 and 422 have D and Q pins assigned to the second partition. Therefore, flip-flops 419 and 422 can be unconditionally assigned to the second partition, as shown in FIG. 4F.

A given storage device cannot be divided between partitions, but can be shared. For example, flip-flop 405 has a D pin tagged as part of the second partition and a Q pin tagged as part of the first partition. Therefore, flip-flop 405 can be tagged as shared between the first and second partitions, as shown in FIG. 4F. Note that the D pin of flip-flop 416 is tagged as part of the second partition whereas the Q pin is tagged as shared between the first and second partitions. Therefore, flip-flop 416 can be unconditionally tagged as being shared between the first and second partitions. In one embodiment, objects connected to the CLK pin of a storage device must have the same tag as the storage device. Therefore, for example, input port 402 and buffer 404 can be assigned to share the first and second partitions, which would be consistent with the tag for flip-flop 405.

Note that when a partition is analyzed during STA, all shared objects as well as the objects unique to that partition will be present. However, not all pins associated with a shared object will have connections. For example, during analysis of the first partition, flip-flop 405 will be present with its CLK pin connected to buffer 404 and input port 402, and its Q pin connected to buffer 406, AND gate 408, etc. However, its D pin would not be connected. In contrast, during analysis of the second partition, flip-flop 405 will be present with its D pin connected to buffer 403 and input port 401. However, its Q pin and its CLK pin would not be connected.

Note that two functional constraints may be imposed in the STA domain. In a first functional constraint, a timing path leading to a given storage device needs to be kept in the same partition to ensure self-sufficient analysis. As defined herein, a timing path can include a launch clock path (or path segment), a data propagation path (or path segment), and a capture clock path (or path segment). For example, consider a flip-flop. In this case, the launch clock path would be the clock signal path connected between an endpoint and the CLK pin of the flip-flop. The data propagation path would be the data signal path between the Q pin of the flip-flop to the next endpoint of another flip-flop. The capture clock path would be the clock signal path between the clock sources to the D pin of the next flip-flop. Thus, in the case of two flip-flops using the same clock and with a first flip-flop Q pin propagating to a second flip-flop D pin, the launch clock path of the first flip-flop is also the capture clock path of its predecessor, and the capture clock path of the second flip-flop is the launch clock path of the second flip-flop leading to the next level. For example, clock buffer cell 415 is the capture path of flip-flop 416 in the second partition, the same time it is also the launch path of the data path eventually leading to flip-flop 409, which belongs to the first partition. Therefore, cell 415 and clock path cell 415 and clock port 413 are assigned to both partitions and become the redundancy across the partitions.

In a second functional constraint, all timing paths leading to a specific stored devices need to be kept complete in the partition the storage device is assigned to. This constraint can address the data path portion. With this constraint, a branch point in the data path leading to multiple endpoints that are not assigned to the same partition also result in redundancy across partition for the region in the fan-in of the branch point.

To ensure balanced runtime and memory distribution among partition, overlap between the partitions can be minimized. This balancing can advantageously minimize redundant and/or wasted analysis, thereby facilitating achievement of performance and capacity goals.

Optimized partitioning for STA should 1) guarantee timing path completeness, 2) maximize partition balance, and 3) minimize inter-partition overlap. Notably, these goals may be competing constraints in determining an optimized partition solution. For example, both the hierarchy driven topological clustering technique (FIG. 2) and the fine grain topological clustering technique (FIG. 3) can guarantee timing completeness. However, when comparing these two techniques, the fine grain topological clustering technique can potentially provide more partition balance at the expense of some inter-partition overlap. In contrast, the hierarchy driven topological clustering technique can potentially provide less inter-partition overlap at some expense of partition balance. Notably, both techniques can generate very high quality partitions for integrated circuit designs ranging from <100,000 objects to tens of millions or more cells and covering very diverse design styles. This optimized partitioning advantageously facilitates both good performance and good capacity improvements of the entire STA flow. Moreover, both techniques enable efficient distributed parallel analysis, eliminate inter-partition STA data dependency, and minimize and/or avoid expensive inter-partition communications.

Yet further, for STA to be done accurately and self-sufficiently in each partition, any design constraints can be divided up to accompany the appropriate partition. Exemplary design constraints for STA include constructs such as clock and generated clock definitions, exceptions such as multi-cycle paths and false paths, scenarios such as logic constants, case values and modes, etc. These constraints are critical to timing analysis and are specified for the entire design before the partitions are generated. Each constraint statement is analyzed to index and classify based on the anchor design objects for the constraints. For constraints referring to global objects such as clocks define by other constraints, further classification of the anchor objects for the dependent constraints is performed recursively. For example, a primary type of global object is a clock defined in the design constraints. In FIG. 4F, a generated clock defined at cell 419 may refer to a master clock source defined on port 413, thereby causing both clocks to be assigned to the same second partition in order to make the generated clock derived from the main clock complete.

Figure 5:
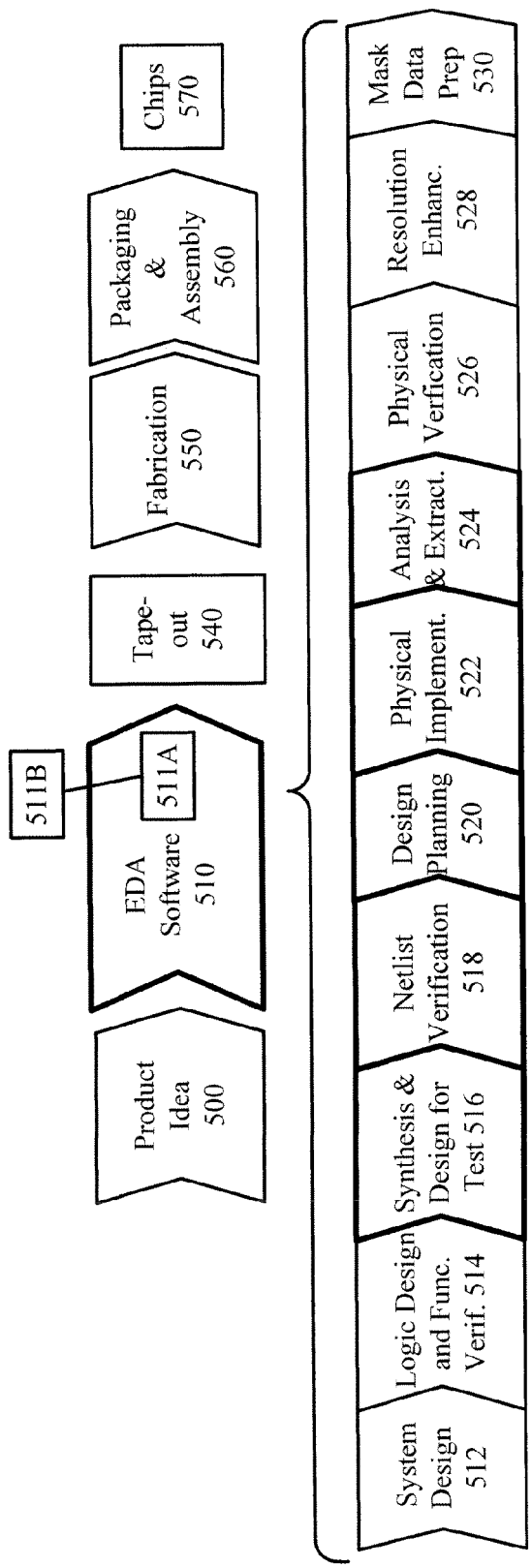
FIG. 5 shows a simplified representation of an exemplary digital ASIC design flow.

FIG. 5 shows a simplified representation of an exemplary digital ASIC design flow. At a high level, the process starts with the product idea (step 500) and is realized in an EDA software design process (step 510). When the design is finalized, it can be taped-out (event 540). After tape out, the fabrication process (step 550) and packaging and assembly processes (step 560) occur resulting, ultimately, in finished chips (result 570).

The EDA software design process (step 510) is actually composed of a number of steps 512-530, shown in linear fashion for simplicity. In an actual ASIC design process, the particular design might have to go back through steps until certain tests are passed. Similarly, in any actual design process, these steps may occur in different orders and combinations. This description is therefore provided by way of context and general explanation rather than as a specific, or recommended, design flow for a particular ASIC.

A brief description of the components/steps of the EDA software design process (step 510) will now be provided. In one embodiment, one or more steps of the EDA software design process can be implemented using a computer-readable medium 511A, which is read by a computer 511B. Note that Astro, AstroRail, ESP, Hercules, IC Compiler, Magellan, Model Architect, Power Compiler, PrimeRail, Proteus, ProteusAF, PSMGen, Saber, StarRC, and System Studio are trademarks of Synopsys, Inc., and CATS, DesignWare, Design Compiler, Formality, Leda, Primetime, Syndicated, TetraMAX, VCS, and Vera are registered trademarks of Synopsys, Inc. System design (step 512): The designers describe the functionality that they want to implement, they can perform what-if planning to refine functionality, check costs, etc. Hardware-software architecture partitioning can occur at this stage. Exemplary EDA software products from Synopsys, Inc. that can be used at this step include Model Architect™, Saber™, System Studio™, and DesignWare® products.

Logic design and functional verification (step 514): At this stage, the VHDL or Verilog code for modules in the system is written and the design is checked for functional accuracy. More specifically, does the design as checked to ensure that produces the correct outputs. Exemplary EDA software products from Synopsys, Inc. that can be used at this step include VCS®, VERA®, DesignWare®, Magellan™, Formality®, ESP™ and LEDA® products.

Synthesis and design for test (step 516): Here, the VHDL/Verilog is translated to a netlist. The netlist can be optimized for the target technology. Additionally, the design and implementation of tests to permit checking of the finished chip occurs. Exemplary EDA software products from Synopsys, Inc. that can be used at this step include Design Compiler®, Power Compiler™, Tetramax®, and DesignWare® products. The above-described partitioning techniques can be included in the tools or programs computing or providing timing information to step 516.

Netlist verification (step 518): At this step, the netlist is checked for compliance with timing constraints and for correspondence with the VHDL/Verilog source code. Exemplary EDA software products from Synopsys, Inc. that can be used at this step include Formality®, PrimeTime™, and VCS® products. The above-described partitioning with redundancy techniques can be included in step 518.

Design planning (step 520): Here, an overall floorplan for the chip is constructed and analyzed for timing and top-level routing. Exemplary EDA software products from Synopsys, Inc. that can be used at this step include Astro™ and IC Compiler™ products. The above-described partitioning techniques can be included in the tools or programs computing or providing timing information to step 520.

Physical implementation (step 522): The placement (positioning of circuit elements) and routing (connection of the same) occurs at this step. Exemplary EDA software products from Synopsys, Inc. that can be used at this step include the Astro™ and IC Compiler™ products. The above-described partitioning techniques can be included in the tools or programs computing or providing timing information to step 520.

Analysis and extraction (step 524): At this step, the circuit function is verified at a transistor level, this in turn permits what-if refinement. Exemplary EDA software products from Synopsys, Inc. that can be used at this step include AstroRail™, PrimeRail™, Primetime®, and Star RC/XT™ products. The above-described partitioning with redundancy techniques can also be used in step 524.

Physical verification (step 526): At this step various checking functions are performed to ensure correctness for: manufacturing, electrical issues, lithographic issues, and circuitry. Exemplary EDA software products from Synopsys, Inc. that can be used at this step include the Hercules™ product.

Resolution enhancement (step 528): This step involves geometric manipulations of the layout to improve manufacturability of the design. Exemplary EDA software products from Synopsys, Inc. that can be used at this step include Proteus™, ProteusAF™, and PSMGen™ products.

Mask data preparation (step 530): This step provides the "tape-out" data for production of masks for lithographic use to produce finished chips. Exemplary EDA software products from Synopsys, Inc. that can be used at this step include the CATS® family of products.

The above-described partitioning with redundancy techniques can be implemented advantageously in one or more computer programs that execute on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors, as well as other types of microcontrollers. Generally, a processor will receive instructions and data from a read-only memory and/or a random access memory. Generally, a computer will include one or more mass storage devices for storing data files; such devices include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks, and CDROM disks. Any of the foregoing can be supplemented by, or incorporated in, application-specific integrated circuits (ASICs).

Although illustrative embodiments of the invention have been described in detail herein with reference to the accompanying figures, it is to be understood that the invention is not limited to those precise embodiment. They are not intended to be exhaustive or to limit the invention to the precise forms disclosed. As such, many modifications and variations will be apparent. For example, as propagation is being performed, any branching points can be tagged. These branching points effectively indicate intersections of fan-in cones. These branching points can be considered "neighbors" of the present partition and hence more beneficial to be included in the same partition. Another example is that a different algorithmic embodiment or partition assignment mechanism may also result in partitions that preserve timing paths or allows redundancy among partition. Note that although bit codes are discussed herein for propagation along signal paths, other types of partition assignment representations may be used in other embodiments.

Figure 6:
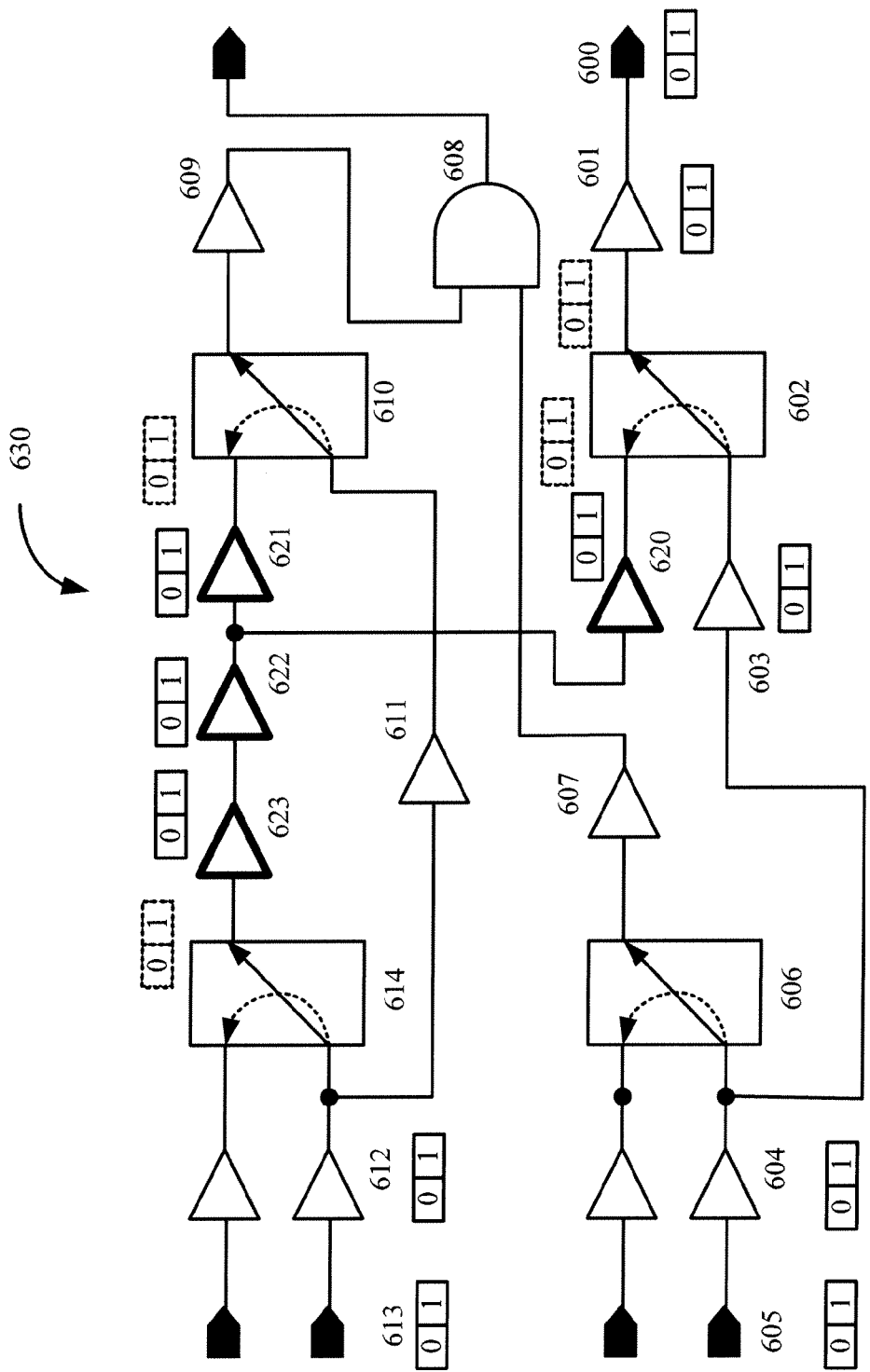
FIG. 6 illustrates an exemplary branching point and how fine grain topological clustering handles this branching point during partitioning.

FIG. 6 illustrates an exemplary circuit 630 that includes a branching point from buffer 622 branching out to buffers 621 and 620. Note that if output port 600 is assigned to a first partition (i.e. 0,1), then buffer 601, the Q pin of flip-flop 602, buffer 603, buffer 604, and input port 605 can be initially tagged as part of the first partition. Because of the assignment of the Q pin of flip-flop 602, the D pin is also preferably selected for the first partition. Tracing backward from D pin of flip-flop 602, buffers 620, 622, and 623, the Q pin of flip-flop 614 (and its clock pin), and buffers 612 and 613 can be included in the first partition. During this process, the branching point 622 is recorded as a first partition preference, which results in buffer 621 and the D pin of flip-flop 610 being favorably added into the first partition as well. Advantageously, this consideration of the topological correlation at the branching point can avoid the redundant presence of buffers 622 and 623 in both partitions, therefore minimizing overlap. Note that flip-flop 602 is now unconditionally assigned to the first partition, whereas flip-flops 614 and 610 may be assigned to first partition (depending on the current cost associated with the first partition) or both the first partition and the second partition (not shown). Other objects in design 630, e.g. flip-flop 606, buffers 607 and 609, and AND gate 608 may be assigned to the first partition, the second partition, or shared between the first and second partitions depending on the current cost associated with the first partition.

Accordingly, it is intended that the scope of the invention be defined by the following Claims and their equivalents.

The invention claimed is:

1. A method of partitioning an integrated circuit design for static timing analysis, the method comprising:
    accessing at least one file listing objects of the design;
    using the at least one file, determining a set of the objects that indicate a hierarchy;
    clustering endpoints corresponding to each hierarchy;
    presetting endpoints of an endpoint cluster using a partition assignment representation;
    using a computer, propagating the partition assignment representation backward along signal paths from the endpoints through the design to determine objects in fan-ins of the endpoints, the propagating populating a partition, the partition assignment representation ensuring timing paths in the partition are complete;
    repeating presetting and propagating for each endpoint cluster; and
    outputting populated partitions for static timing analysis, wherein at least one set of populated partitions includes redundant objects.

2. The method of claim 1, wherein the file is a VHDL file, wherein the clustering endpoints includes leveraging at least one of physical and logical hierarchy in the VHDL file.

3. The method of claim 1, wherein the file is a Verilog file, wherein the clustering endpoints includes leveraging at least one of physical and logical hierarchy in the Verilog file.

4. The method of claim 1, further comprising:
    optimizing the populated partitions, the optimizing including merging a set of partitions based on a cost metric associated with each populated partition.

5. The method of claim 4, further including determining whether merging occurs by using the cost metric.

6. The method of claim 1, wherein clustering endpoints includes over-clustering.

7. A method of partitioning an integrated circuit design for static timing analysis, the method comprising:
    accessing at least one file listing objects of the design;
    using the at least one file, estimating a global cost and setting a target cost;
    presetting seed endpoints of a fine grain cluster using a partition assignment representation;
    using a computer, propagating the partition assignment representation along signal paths from the seed endpoints back through the design to determine fan-ins to the seed endpoints, the propagating populating a partition, wherein propagating is stopped when a cost associated with that populated partition is equal to or greater than the target cost;
    repeating presetting and propagating for each fine grain cluster; and
    outputting populated partitions for static timing analysis, wherein at least one set of populated partitions includes redundant objects.

8. The method of claim 7, further comprising:
    gathering clustering preferences, the clustering preferences facilitating adding at least one seed endpoint to the fine grain cluster based on a constraint associated with an object in the populated partition.

9. The method of claim 8, wherein the gathering clustering preferences includes indicating logical branching points where a pin has multiple fan-outs leading to more than one endpoint.

10. The method of claim 8, wherein the gathering clustering preferences includes indicating physical coupling between wires where two or more wire connections between different cells lead to more than one endpoint.

11. The method of claim 7, wherein the file is a VHDL file, wherein the clustering endpoints includes leveraging at least one of physical and logical hierarchy in the VHDL file.

12. The method of claim 7, wherein the file is a Verilog file, wherein the clustering endpoints includes leveraging at least one of physical and logical hierarchy in the Verilog file.

13. The method of claim 7, further including determining the cost using static design metrics.

14. The method of claim 7, further including determining the cost using static design metrics, wherein the static design metrics include at least one of cells, pins, nets, arc, and clocks.

15. The method of claim 7, further including evaluating the cost by using at least one pre-determined static metric.

16. The method of claim 7, further including evaluating the cost by using multiple, pre-determined static metrics.

17. The method of claim 7, further including evaluating the cost by using multiple, weighted pre-determined static metrics.

18. A non-transitory computer-readable medium storing therein computer-executable instructions for partitioning an integrated circuit design for static timing analysis, the computer-executable instructions, when executed by a computer, perform steps comprising:
    accessing at least one file listing objects of the design;

using the at least one file, determining a set of the objects that indicate a hierarchy;
clustering endpoints corresponding to each hierarchy;
presetting endpoints of an endpoint cluster using a partition assignment representation;
propagating the partition assignment representation backward along signal paths from the endpoints through the design to determine objects in fan-ins of the endpoints, the propagating populating a partition, the partition assignment representation ensuring timing paths in the partition are complete;
repeating presetting and propagating for each endpoint cluster; and
outputting populated partitions for static timing analysis, wherein at least one set of populated partitions includes redundant objects.

19. The non-transitory computer-readable medium of claim 18, wherein the file is a VHDL file, wherein the clustering endpoints includes leveraging at least one of physical and logical hierarchy in the VHDL file.

20. The non-transitory computer-readable medium of claim 18, wherein the file is a Verilog file, wherein the clustering endpoints includes leveraging at least one of physical and logical hierarchy in the Verilog file.

21. The non-transitory computer-readable medium of claim 18, further comprising:
optimizing the populated partitions, the optimizing including merging a set of partitions based on a cost metric associated with each populated partition.

22. The non-transitory computer-readable medium of claim 18, further comprising:
optimizing the populated partitions, the optimizing including merging a set of partitions based on a cost metric associated with each populated partition, wherein the cost metric determines whether merging occurs.

23. The non-transitory computer-readable medium of claim 18, wherein clustering endpoints includes over-clustering.

24. A non-transitory computer-readable medium storing therein computer-executable instructions for partitioning an integrated circuit design for static timing analysis, the computer-executable instructions, when executed by a computer, perform steps comprising:
accessing at least one file listing objects of the design;
using the at least one file, estimating a global cost and setting a target cost;
presetting seed endpoints of a fine grain cluster using a partition assignment representation;
propagating the partition assignment representation along signal paths from the seed endpoints back through the design to determine fan-ins to the seed endpoints, the propagating populating a partition, wherein propagating is stopped when a cost associated with that populated partition is equal to or greater than the target cost;
repeating presetting and propagating for each fine grain cluster; and
outputting populated partitions for static timing analysis, wherein at least one set of populated partitions includes redundant objects.

25. The non-transitory computer-readable medium of claim 24, further comprising:
gathering clustering preferences, the clustering preferences facilitating adding at least one seed endpoint to the fine grain cluster based on a constraint associated with an object in the populated partition.

26. The non-transitory computer-readable medium of claim 25, wherein the gathering clustering preferences includes indicating logical branching points where a pin has multiple fan-outs leading to more than one endpoint.

27. The non-transitory computer-readable medium of claim 25, wherein the gathering clustering preferences includes indicating physical coupling between wires where two or more wire connections between different cells lead to more than one endpoint.

28. The non-transitory computer-readable medium of claim 24, wherein the file is a VHDL file, wherein the clustering endpoints includes leveraging at least one of physical and logical hierarchy in the VHDL file.

29. The non-transitory computer-readable medium of claim 24, wherein the file is a Verilog file, wherein the clustering endpoints includes leveraging at least one of physical and logical hierarchy in the Verilog file.

30. The non-transitory computer-readable medium of claim 24, further including determining the cost using static design metrics.

31. The non-transitory computer-readable medium of claim 24, further including determining the cost using static design metrics, wherein the static design metrics include at least one of cells, pins, nets, arc, and clocks.

32. The non-transitory computer-readable medium of claim 24, further including evaluating the cost by using at least one pre-determined static metric.

33. The non-transitory computer-readable medium of claim 24, further including evaluating the cost by using multiple, pre-determined static metrics.

34. The non-transitory computer-readable medium of claim 24, further including evaluating the cost by using multiple, weighted pre-determined static metrics.

* * * * *

UNITED STATES PATENT AND TRADEMARK OFFICE
CERTIFICATE OF CORRECTION

PATENT NO.        : 8,261,220 B2
APPLICATION NO.   : 12/628096
DATED             : September 4, 2012
INVENTOR(S)       : Qiuyang Wu et al.

Page 1 of 2

It is certified that error appears in the above-identified patent and that said Letters Patent is hereby corrected as shown below:

In the Claims

Column 13
Claim 1, Line 60, insert --the-- before "presetting".
Claim 1, Line 60, insert --the-- before "propagating".
Claim 1, Line 62, insert --the-- before "static".
Claim 1, Line 63, insert --the-- before "populated".
Claim 2, Line 65, insert --at least one-- before "file" (first occurrence).
Claim 2, Line 66, replace "wherein the clustering endpoints includes" with --and further including--.

Column 14
Claim 3, Line 1, insert --at least one-- before "file" (first occurrence).
Claim 5, Line 9, insert --the-- before "merging".
Claim 6, Line 10, insert --the-- before "clustering".
Claim 7, Line 23, insert --the-- before "propagating".
Claim 7, Line 26, insert --the-- before "presetting".
Claim 7, Line 26, insert --the-- before "propagating".
Claim 7, Line 28, insert --the-- before "static".
Claim 7, Line 29, insert --the-- before "populated".
Claim 12, Line 44, insert --at least one-- before "file" (first occurrence).
Claim 12, Line 45, replace "wherein the clustering endpoints includes" with --and further including--.
Claim 12, Line 47, insert --at least one-- before "file" (first occurrence).
Claim 12, Line 48, replace "wherein the clustering endpoints includes" with --and further including--.

Column 15
Claim 18, Line 12, insert --the-- before "presetting".
Claim 18, Line 12, insert --the-- before "propagating".
Claim 18, Line 14, insert --the-- before "static".
Claim 18, Line 15, insert --the-- before "populated".

Signed and Sealed this
Twenty-third Day of September, 2014

Michelle K. Lee
*Deputy Director of the United States Patent and Trademark Office*

CERTIFICATE OF CORRECTION (continued)
U.S. Pat. No. 8,261,220 B2

Claim 18, Line 18, insert --at least one-- before "file" (first occurrence).
Claim 20, Line 22, insert --at least one-- before "file" (first occurrence).
Claim 22, Line 35, insert --the-- before "merging".
Claim 23, Line 37, insert --the-- before "clustering".

Column 16
Claim 24, Line 2, insert --the-- before "propagating" (second occurrence).
Claim 24, Line 5, insert --the-- before "presetting".
Claim 24, Line 5, insert --the-- before "propagating".
Claim 24, Line 7, insert --the-- before "static".
Claim 24, Line 8, insert --the-- before "populated".
Claim 28, Line 26, insert --at least one-- before "file" (first occurrence).
Claim 28, Lines 26-27, replace "wherein the clustering endpoints includes" with --and further including--.
Claim 29, Line 30, insert --at least one-- before "file" (first occurrence).
Claim 29, Lines 30-31, replace "wherein the clustering endpoints includes" with --and further including--.